(12) United States Patent
Allen et al.

(10) Patent No.: US 6,502,236 B1
(45) Date of Patent: Dec. 31, 2002

(54) METHOD AND APPARATUS FOR AUTOMATIC GENERATION OF PROGRAMS FOR PROCESSING DATA UNITS OF MULTIPLE FORMATS

(75) Inventors: Michael D. Allen, Acton, MA (US); Kevin P. Fox, Babson Park, MA (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/270,568

(22) Filed: Mar. 16, 1999

(51) Int. Cl.[7] .................................................. G06F 9/45
(52) U.S. Cl. ........................ 717/136; 717/106; 717/117
(58) Field of Search ................................. 717/5, 6, 7, 8, 717/9, 136–161, 106, 117; 709/218, 232, 237, 238, 239, 240, 241, 242, 249, 250, 311, 313, 319

(56) References Cited

U.S. PATENT DOCUMENTS

| | | | | |
|---|---|---|---|---|
| 5,488,569 A | * | 1/1996 | Kaplan et al. | 709/228 |
| 5,721,912 A | * | 2/1998 | Stepczyk et al. | 707/102 |
| 5,857,194 A | * | 1/1999 | Kelliher et al. | 707/101 |
| 5,872,810 A | * | 2/1999 | Philips et al. | 375/222 |
| 5,896,521 A | * | 4/1999 | Shackleford et al. | 703/21 |
| 6,212,566 B1 | * | 4/2001 | Vanhoof et al. | 709/230 |
| 6,308,178 B1 | * | 10/2001 | Chang et al. | 707/100 |

OTHER PUBLICATIONS

*Affidavit of Kevin P. Fox executed on Jan. 27, 2000 with Exhibits A–B.*
*Affidavit of Mark Bernasconi executed on Dec. 13, 1999 with Exhibits A–E.*
*Affidavit of Jerome Neff executed on Dec. 16, 1999 with Exhibit A.*

* cited by examiner

*Primary Examiner*—Tuan Q. Dam
*Assistant Examiner*—Hoang-Vu Antony Nguyen-Ba
(74) *Attorney, Agent, or Firm*—Weingarten, Schurgin, Gagnebin & Lebovici LLP

(57) ABSTRACT

A system for automatic program generation which receives a number of input format descriptors and a number of output format descriptors. The system generates a program for converting an input data sequence having a format described by input format descriptors to an output data sequence having a format described by the output format descriptors. The program may then be executed responsive to an input data stream, wherein a portion of the input data stream corresponds to the input data sequence. The input data sequence and output data sequence consist of a number of data type indicators. In an exemplary embodiment, the input data type indicators correspond to fields of data units received by a forwarding device, and the output data type indicators correspond to fields of corresponding data units forwarded by the forwarding device. In the exemplary embodiment, the generated program is executed on a hardware processor to convert a data unit received on a communication link over a information flow to an output data unit for transmission on a second communication link. The initial data unit of the information flow triggers generation and loading of the program while the forwarding device is up and running.

18 Claims, 10 Drawing Sheets

METHOD AND APPARATUS FOR AUTOMATIC GENERATION OF PROGRAMS FOR PROCESSING DATA UNITS OF MULTIPLE FORMATS

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Files of instructions known as "programs" are used to control the operation of various types of hardware components, including microprocessors and/or application specific integrated circuits (ASICs). Often, a program is initially written in a high level language such as C++ or PASCAL, and then converted by a compiler program into a lower level representation sometimes known as assembler language. The instructions of the assembler language program can be executed by the target system. Such a programming model generally requires that the program be fully written or generated prior to being executed to do the work it is designed to perform.

However, in certain situations, it is either undesirable or unfeasible to provide a complete program before a system in which the program executes begins operation. This type of situation may arise, for example, where the number of possibilities that must be addressed by the system is so large that a complete program file designed to handle all situations would be prohibitively large. Another way of looking at this category of problems is that the specific program requirements are not known until execution time. A program designed to handle all possible requirements that may arise would be wasteful, and difficult to modify or extend. It may also be desirable to limit program size in order to conserve memory resources used to store the program.

For example, lack of hardware resources, as may be found in embedded systems which are designed to perform a specific task in real-time, may limit the amount of space available to store the program. Embedded systems are often employed in networking and communications systems such as forwarding devices. A forwarding device is any device which forwards data units from ports on which they are received to ports from which they are re-transmitted, in accordance with some well-defined topology management protocol. Examples of well-defined topology management protocols include Border Gateway Protocol 4 (BGP4), Open Shortest Path First (OSPF), or DVMRP (Distance Vector Multicast Routing Protocol. During its operation, the forwarding device modifies the received data units in order to perform routing and format translations on a per-information flow basis. Each information flow is considered to be a mapping of an input port to one or more output ports according to data unit header information in the received data unit.

The number of combinations of data unit input formats and output formats that must potentially be processed in a forwarding device is very large. Accordingly, a program which would handle all possible combinations of input and output formats, including necessary modifications of data unit header field contents, is extremely large and complicated, making it difficult to support or extend, and costly in terms of storage requirements.

In addition, typical compiler technology has placed an emphasis on performing many optimizations while generating the assembler language program. This arises from the desire to trade off time spent during compilation for assembler code which is fast and compact. However, this approach does not consider any possibility of generating assembler code in real-time, while the system itself is operating. In particular, where functionality must be modified on a "just in time" basis, for example in response to receipt of new information flow, code generation based on existing compilers would be undesirably slow, and result in excessive data unit queuing, causing poor performance.

For the above reasons, it would be desirable to have a system for generating an assembler language program in real-time in response to program requirements that are determined during system operation. The system should be fast enough to generate assembler code to handle new operational requirements as they are received. Moreover, the system should be applicable to generation of a program which is capable of performing data unit format and header content conversion and modification in a forwarding device implementation.

SUMMARY OF THE INVENTION

In accordance with the present invention, there is disclosed a system for automatic program generation which receives a number of input format descriptors and a number of output format descriptors. The system generates a program for converting an input data sequence having a format described by the input format descriptors to an output data sequence having a format described by the output format descriptors. The program may be generated, loaded, and then executed in response to receipt of an input data stream, wherein a portion of the input data stream corresponds to the input data sequence. The input data sequence and output data sequence consist of a number of data type indicators.

In an exemplary embodiment, each layer of a communications protocol stack is represented by 0 or more format descriptors. Examples of well known protocol stacks include the IP protocol stack, the DECNet protocol stack, and the AppleTalk protocol stack. Similarly, each field within a data unit is represented by 0 or more data type indicators. Accordingly, the input data type indicators may correspond to fields of data units received by a forwarding device, and the output data type indicators may correspond to fields of corresponding data units forwarded by the forwarding device. In the exemplary embodiment, the generated program is executed on a hardware processor to convert a data unit that is received on a first communication link into an output data unit for transmission on a second communication link. Generation and loading of the program may be triggered by receipt of an initial data unit for a particular information flow.

The generated program, for example, converts a received data unit in the well known Ethernet format to an output data unit in the similarly well known IP over ATM format, or vice versa, as appropriate for the specific information flow.

Thus there is disclosed a system for generating an assembler language program in real-time in response to program requirements that are determined during system operation. The system is fast enough to generate assembler code to handle new operational requirements as they are received. Moreover, the system is well suited to generation of a program which is capable of performing data unit format and header content conversion and modification in a forwarding device implementation.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
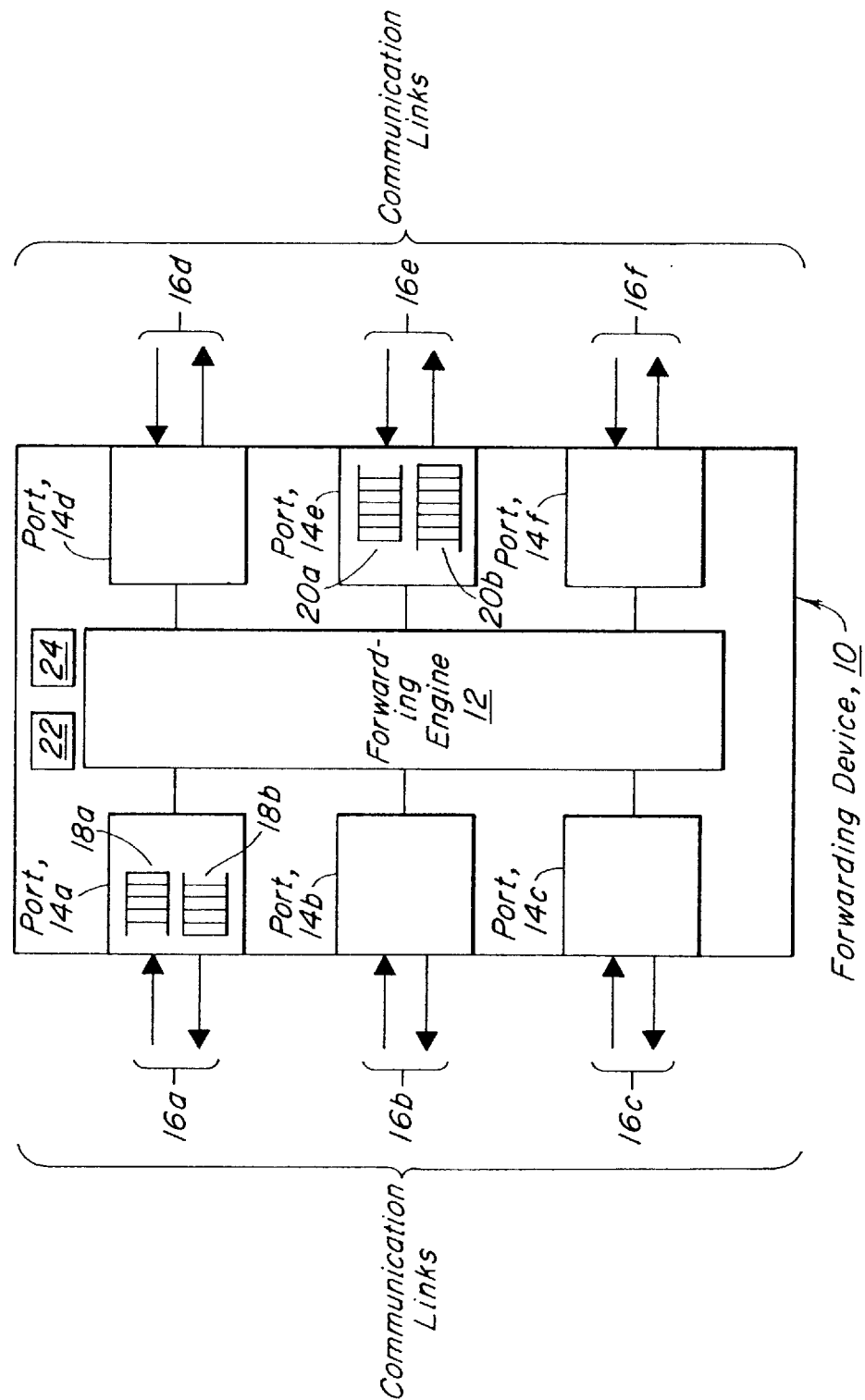
FIG. 1 shows an environment in which an illustrative embodiment of the disclosed system operates.

FIG. 1 shows an example of an operational environment in which the disclosed system may be embodied. FIG. 1 shows a forwarding device 10, including a number of ports 14 coupled to respective communication links 16. The forwarding device 10 further includes a forwarding engine 12, as well as a microprocessor 22 and a memory 24.

During operation of the elements shown in FIG. 1, data units are received at various ones of the ports 14 and forwarded through the forwarding engine 12 to other ones of the ports 14. During processing of the data units received, the forwarding device 10 performs certain internetworking forwarding functions including Internet Protocol Version 4 Routing (IPv4 Routing), bridging and filtering. In addition, the forwarding device 10 performs data unit format translations such as translation between Ethernet data units and Internet Protocol over Asynchronous Transfer Mode (IPoATM) data units.

Figure 2:
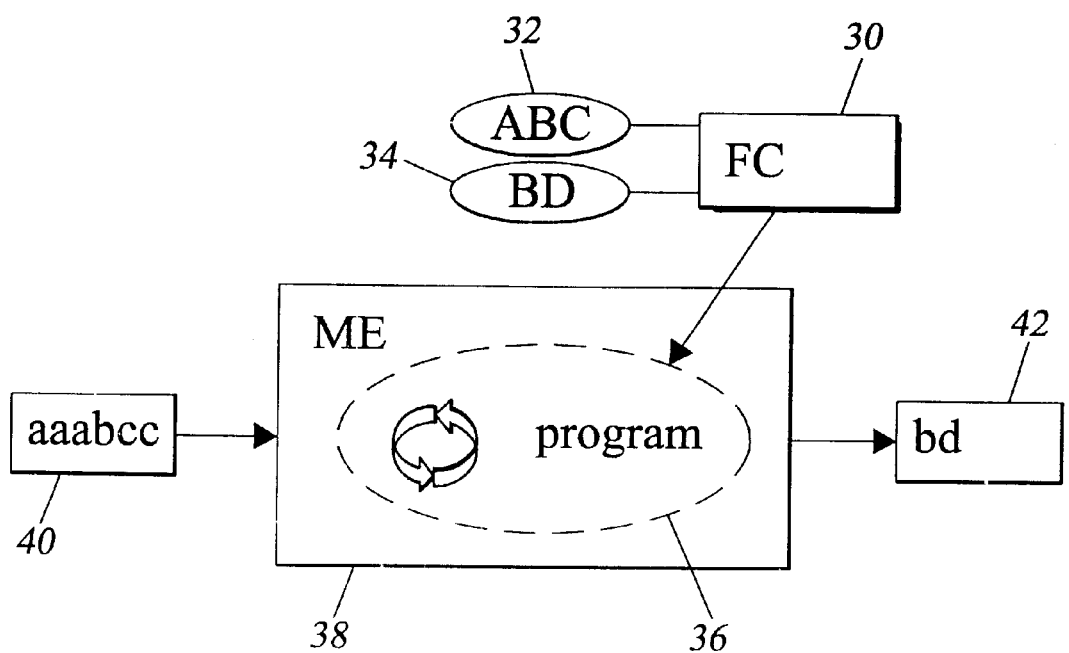
FIG. 2 shows an example of the disclosed system with modification engine.

FIG. 2 shows a fast compiler 30 operating in connection with a modification engine 38. During operation of the elements shown in FIG. 2, the fast compiler 30 executes on the processor 22 shown in FIG. 1, which may consist, for example, of a Motorola PowerPC or AMD 29030. The fast compiler 30 generates an assembler language program 36, which is executed by the modification engine 38. The modification engine 38 is, for example, an ASIC designed to perform real-time modifications on an input data stream 40 in order to generate an output data stream 42. In the embodiment of FIG. 2, the input to the fast compiler 30 includes a series of input format descriptors 32 and a series of output format descriptors 34. Each layer of a communications protocol stack is represented by 0 or more format descriptors, and the descriptors within the input format descriptor series and the output descriptor series are guaranteed to be ordered in the same order as the layers of the protocol stack.

The input format descriptor series 32 describes the format of the input data stream 40, while the output format descriptor series 34 describes the format of the output data stream 42. The input data stream 40 and output data stream 42 consist of strings of predetermined data sequences, where each data sequence corresponds to one of the format descriptors from which the input and output format descriptors are formed. When the assembler language program 36 is executed by the modification engine 38, the input data steam 40 is modified to the format of the output data stream 42 as specified by the output format descriptor series 34.

In the example of FIG. 2, the format descriptors A, B, C, and D, correspond to data sequences aaa, b, cc, and d respectively. Accordingly, the input format descriptor series ABC and output format descriptor series BD would cause the fast compiler 30 to generate a program 36 in the assembler language of the modification engine 38 which would transform an input data stream of aaabcc into an output data stream of bd. The relationship between input format descriptors and output format descriptors may be 0 or more to 0 or more. For example, the data sequences corresponding to the input format descriptors AB were replaced with the data sequences corresponding to the output format descriptor B in the example of FIG. 2.

In the embodiment of FIG. 2, the data sequences aaa, b, etc. are data type indicators, not value indicators. Accordingly, if a is a single integer character type, and b indicated an alphabetic character, "123*a*" and "888*z*" would both be data streams accurately described by the sentence "aaab".

Figure 3:
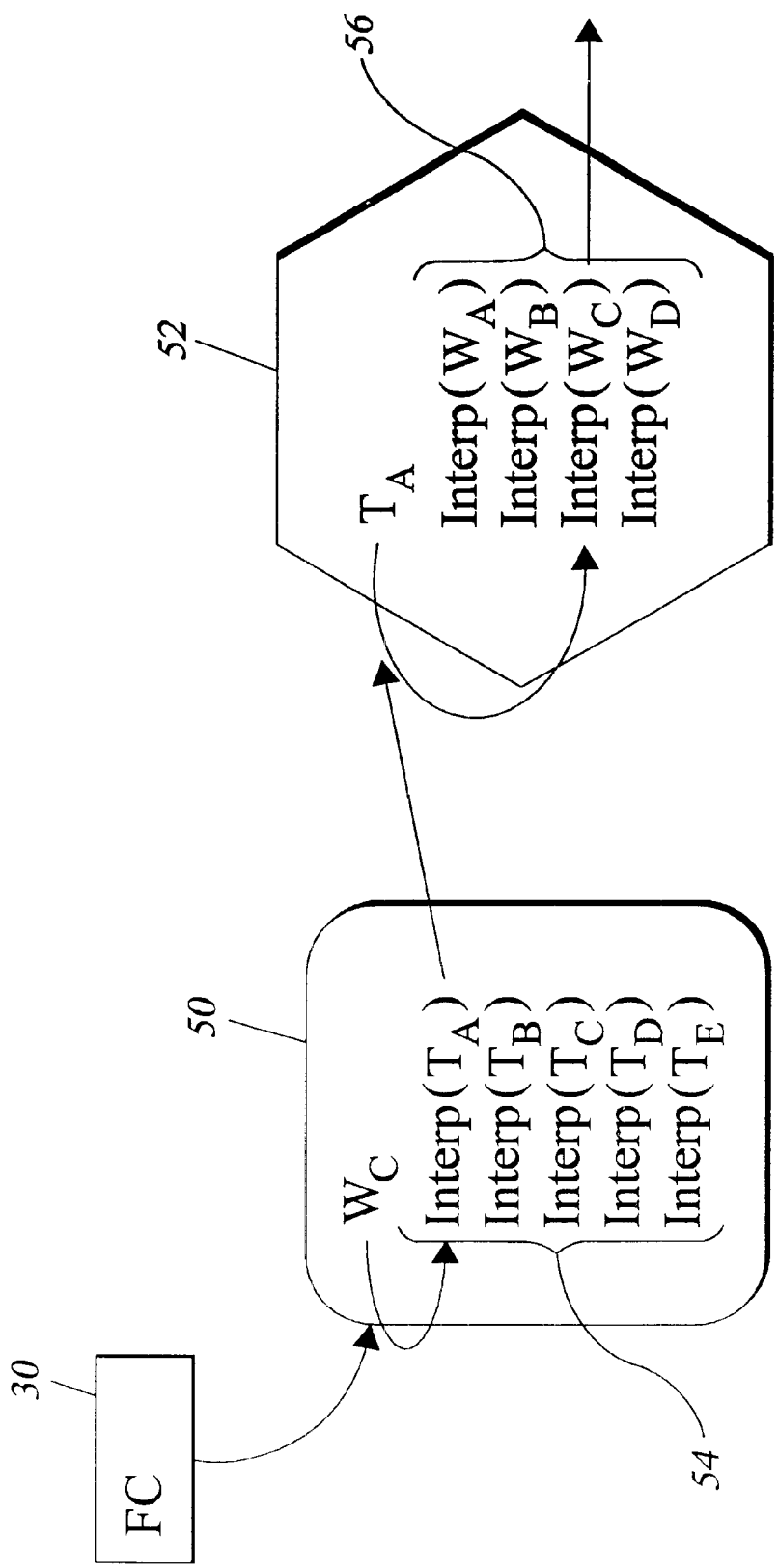
FIG. 3 shows structures of a word object and a translator object.

FIG. 3 shows a word object $W_c$ 50 and a translator object $T_A$ 52, corresponding to an input format descriptor and output format descriptor respectively, as instantiated during execution of the fast compiler 30. As described below, the fast compiler 30 achieves fast compilation by using polymorphic callback methods to determine derived type information from a base object type in constant time without changing with the number of format descriptors, and by using intelligent data objects to record compiler state and for later evaluating output format descriptors.

Polymorphic Callback Methods

The fast compiler 30 instantiates objects having a base type of Word corresponding to each of the format descriptors in the input format descriptor series and the output format descriptor series. In FIG. 3 an example object of base type Word is shown as word object $W_c$ 50. In order to process the input format descriptor series, the fast compiler 30 instantiates an object having a base type of Translator for each format descriptor in the input format descriptor series, such as translator object $T_A$ 52. Each translator object has interpret methods capable of interpreting any possible format descriptor in the input format descriptor series. The design of the fast compiler 30 provides that all word objects derive from a common Word base type, and all translator objects derive from a common Translator base type. This design allows the fast compiler 30 to handle word objects for each format descriptor through the common Word base type, freeing the fast compiler 30 from any need to know about specific format descriptors or their associated derived type translators.

For a translator object to invoke the correct interpret method for a particular format descriptor, it must determine the derived type of the corresponding word object. Using a conventional mechanism for this purpose, such as the Run Time Type Information (RTTI) facility provided in the C++ run time environment, would require a number of operations proportional to half the number of possible input format descriptors. For example, if the fast compiler 30 understood 30 input words, an average of 15 RTTI conversions and comparisons would need to be made in order to determine each word object's derived type. In order to avoid this, the fast compiler 30 employs a polymorphic callback method in the Word and Translator base types to provide fast RTTI. The fast compiler 30 defines derived types having the Word base type which provide specific interpreters for each derived type of Translator base type. Using this architecture, when the fast compiler 30 calls a derived type specific interpreter in a translator object on a word object having the base type Word, only one additional function call is required, and no comparisons. Accordingly, the computational requirements for this action do not change as the number of format descriptors understood by the fast compiler and translators used by the fast compiler increase.

FIG. 3 shows a Word object $W_c$ 50 and a translator object $T_A$ 52, as instantiated during execution of the fast compiler 30. The fast compiler as illustrated in FIG. 3 is unaware of the derived types of $W_c$ 50 and $T_A$ 52 but is aware that they are a word object and translator object respectively. Accordingly, what is available to the fast compiler 30 is:

W::Interp( )

and

T::Interp( )

In the example of FIG. 3, the fast compiler 30 needs to perform the method invocation $T_A$: :Interp(Wc). Accordingly, using the type information it has available, the fast compiler 30 calls W::Interp(T). However, because W::Interp( ) is polymorphic the actual method invoked is Wc::Interp(T). Similarly, T now interprets the (now fully typed) word object $W_c$ 50 by invoking $T_A$: :Interp (Wc).

Intelligent Translator Objects

The fast compiler 30 must examine both the input format descriptor series and output format descriptor series, and make comparisons between the input format descriptors and output format descriptors to determine what assembler code should be generated to translate the input data stream to the output data stream. These comparisons have the potential to be very computation intensive, as there may be different actions to be taken for each input/output format descriptor combination. Since it possible to have a many to one or one to many relationship between input and output format descriptors, the number of combinations is relatively high.

In order to limit the amount of computation required to perform these comparisons, the fast compiler 30 uses type information of the word and translator objects as a basis for the decisions that must be made at each comparison point. To facilitate this, each word object has an interpreter for each derived translator type, and each translator object has an interpreter for each derived word type.

The fast compiler 30 first applies a translator object's interpreter, referred to herein as the initial interpreter, to each word object corresponding to a format descriptor in the input format descriptor series, in the manner described above under Polymorphic Callback Methods. The order of interpretation is the same as the order of the data flow; thus, if the format descriptor A described the beginning of the data, and format descriptor B described the end of the data, the translator would interpret first A, than B. As the translator $T_I$ is applied to each word object, $T_I$'s word type specific interpreter performs operations appropriate to that derived word type. That action is typically to record an instance of a different translator type, which will be used when evaluating the word objects associated with the format descriptors in the output format descriptor series. However, a translator's interpreter could do nothing, or could record some information in the fast compiler 30 for later use by another translator or the fast compiler 30 itself.

At this point the fast compiler 30 has an ordered list of translator objects that are used to interpret word objects associated with format descriptors describing the output data flow. In a situation where there is a one to one mapping between input format descriptors and output format descriptors, each translator object is discarded after it interprets one word object. In a many to one mapping, translator objects may be discarded without performing any interpretation, and in a one to many mapping scenario, a single translator object may interpret many word objects before being discarded. The logic which determines how many word objects to interpret and what each interpretation means, is programmed into each translator object. Accordingly, the fast compiler can be configured to deal with any possible translation request. Since interpreter selection is based on object type, and handled by available object oriented run time models efficiently, and because each interpreter may be programmed individually, the fast compiler 30 provides flexibility without sacrificing speed.

Figure 4:
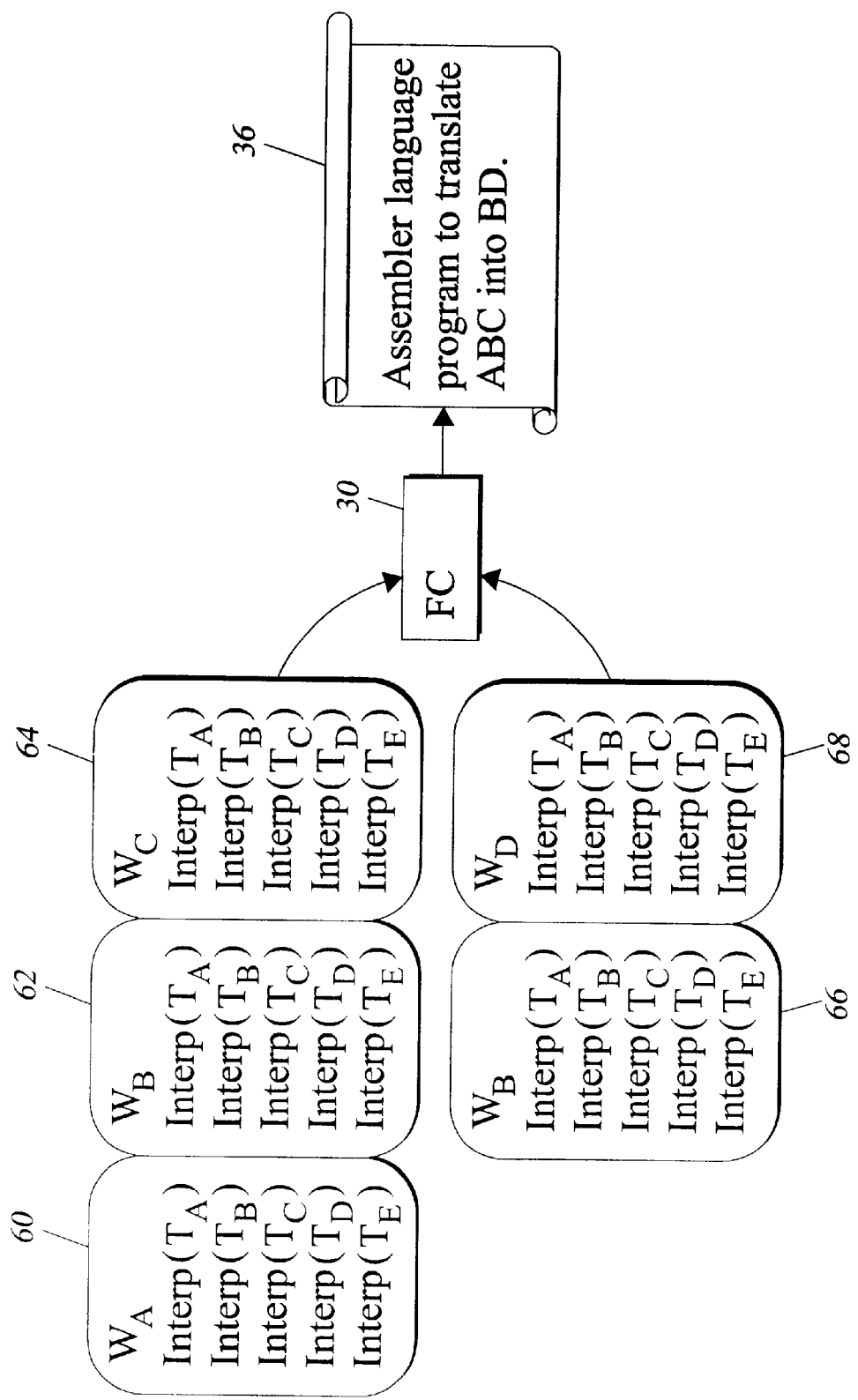
FIG. 4 shows word objects corresponding to an illustrative set of input and output format descriptors.
Figure 5:
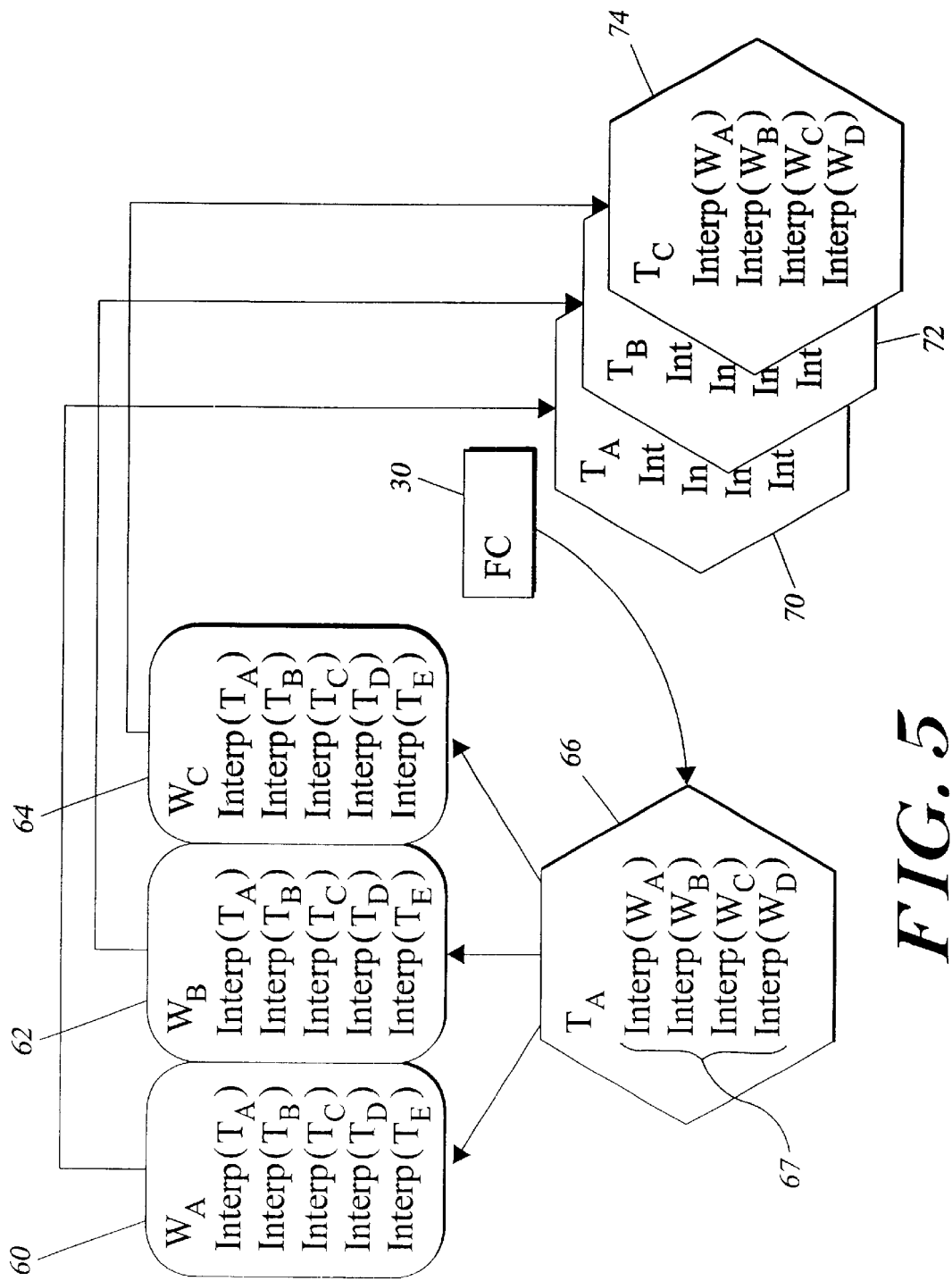
FIG. 5 shows word objects and translator objects used during processing of the illustrative set of input and output format descriptors.
Figure 6:
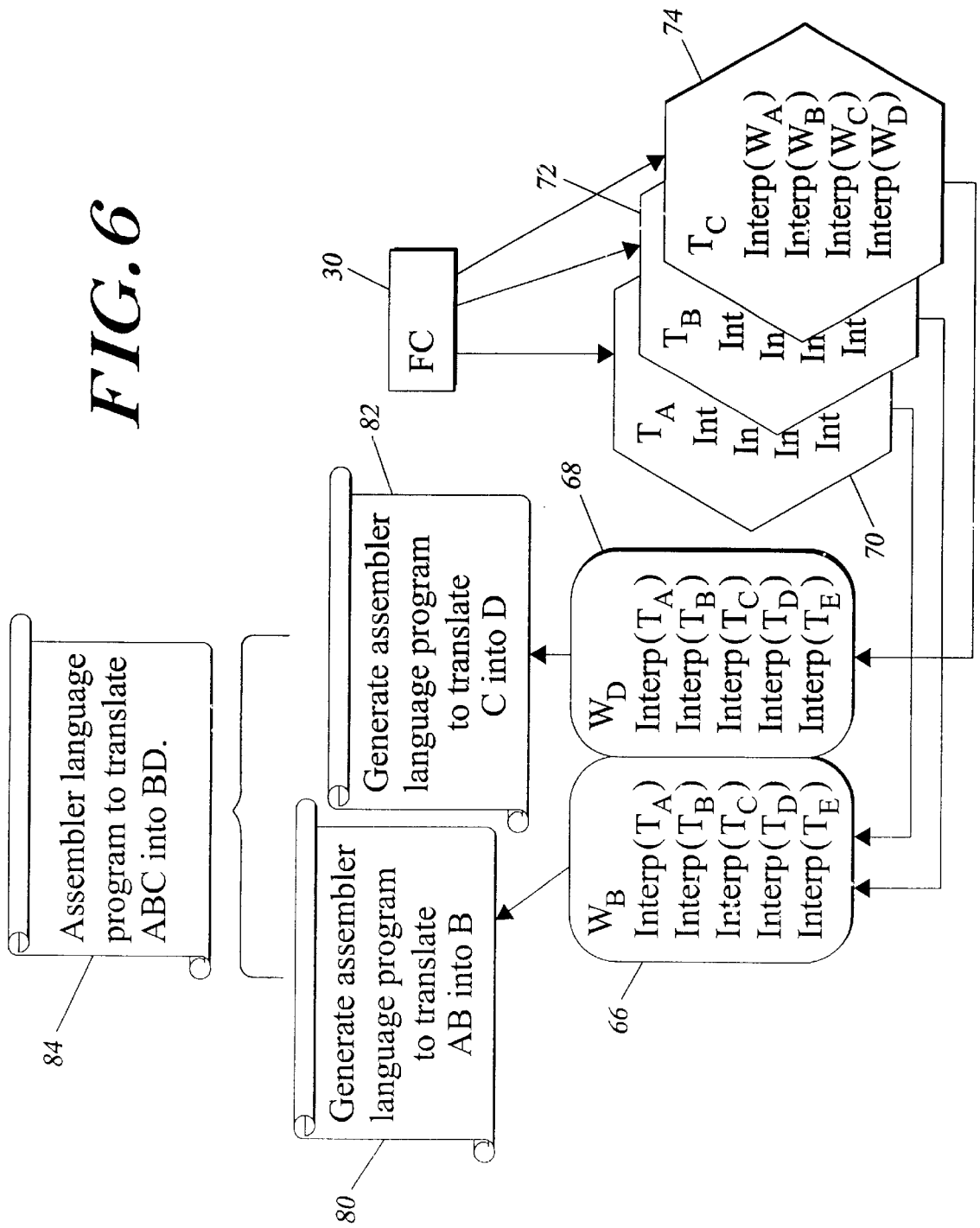
FIG. 6 further depicts operation of the disclosed system during processing of the illustrative set of the input and output format descriptors.

FIGS. 4–6 illustrate operation of the disclosed system with reference to the input format descriptor series and output format descriptor series set forth in FIG. 2. The word objects 60, 62, and 64 correspond to the input format descriptors 32 in FIG. 2, and the word objects 66 and 68 correspond to the output format descriptors 34 of FIG. 2. During operation of the elements shown in FIGS. 4–6, the fast compiler 30 applies its initial translator $T_I$ 66 to each word object corresponding to a format descriptor in the input format descriptor series. $T_I$ interpreters 67 are designed to generate and store a new translator for each word object encountered. For purposes of example, there is a possible action to take for each input format descriptor in the example. Accordingly, three translator objects $T_A$ 70, $T_B$ 72 and $T_C$ 74 are generated and stored. In this way the three translator objects are said to be recorded by the initial translator $T_I$ 66. In an alternative scenario, where it is known that the input format descriptor corresponding to word object $W_A$ 60 initiates no action regardless of which format descriptors in the output format descriptor series it is mapped to, then $T_I$: :Interp($W_A$) would not generate $T_A$ 70.

As depicted in FIG. 6, the fast compiler 30 then applies the three translator 70, 72 and 74 to the word objects corresponding to the format descriptors in the output format descriptor series. Because the objects $W_A$ 60 and $W_B$ 62 for the input format descriptor series map to the object $W_B$ 66 for the output format descriptor series, when $T_A$ interprets $W_B$ 66, no action is taken. At step 80, $T_B$ 72 generates assembler code to translate data having a format corresponding to format descriptors AB into data with a format described by format descriptor B. Similarly, at Step 82, $T_C$ generates code to translate data with format C into format D. Once all translators have run, the fast compiler 30 concatenates the assembler program fragments into a complete program.

Illustrative Forwarding Device Based Embodiment

Figure 7:
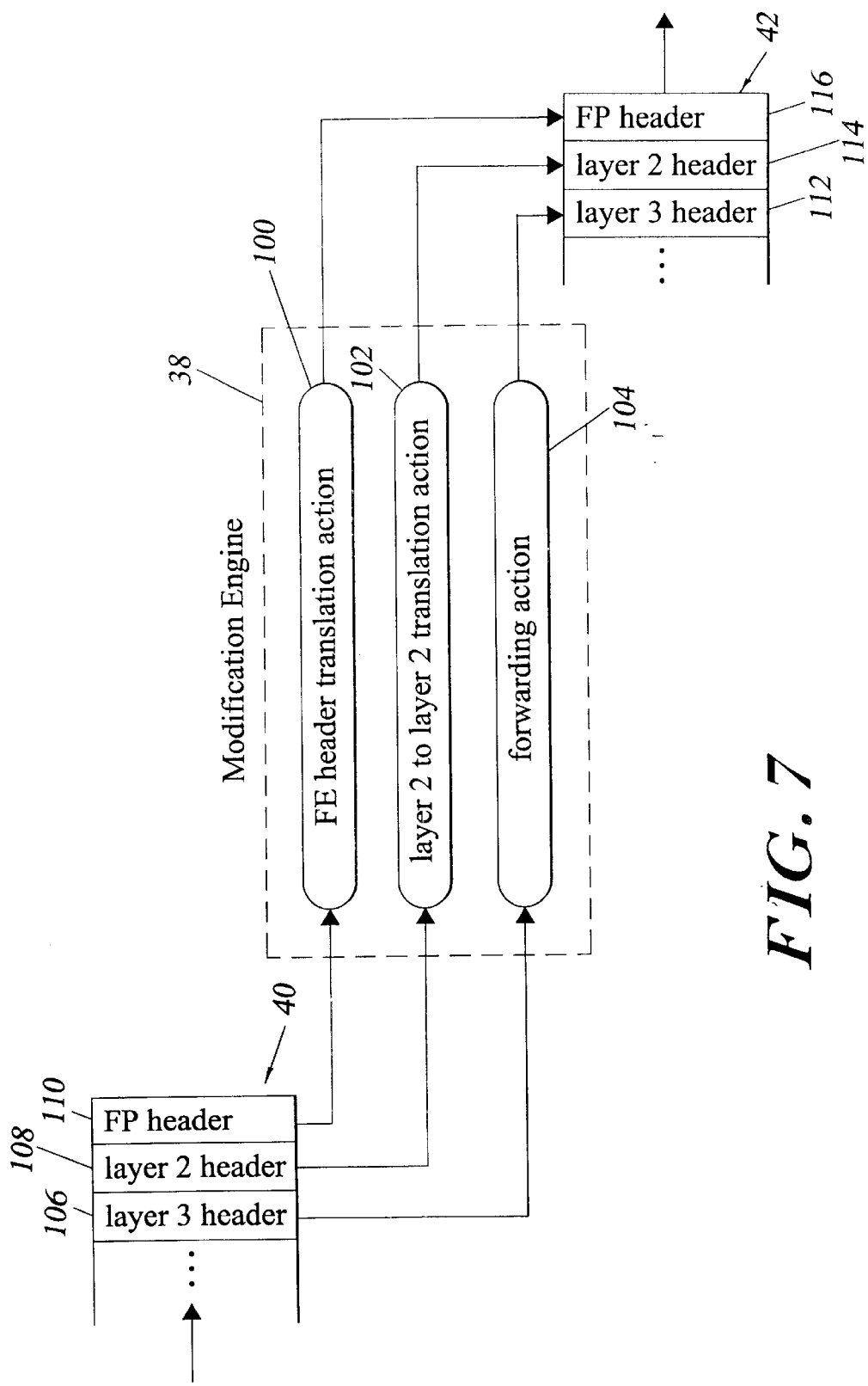
FIG. 7 describes operation of the disclosed system in an illustrative embodiment.

FIGS. 7–10 describe an illustrative embodiment of the disclosed system in a forwarding device. In the embodiment of FIGS. 7–10, the fast compiler 30 of FIGS. 1–6 is embodied as the Modification Engine Manager, and sometimes referred to as the MM. The purpose of the MM is to generate a program for the Modification Engine (ME) 38, as shown in FIG. 7, which corresponds to the Modification Engine 38 as shown in FIG. 2. When the generated program is executed it will cause the ME to make modifications to received data units 40 referred to with regard to FIGS. 7–10 as "frames". The modifications performed in this regard by the ME 38 provide support for internetworking forwarding functions including IPv4 routing, bridging and filtering. The ME further provides support for frame format translation (media encapsulation translation) including translation from Ethernet to IPoATM format and vice versa.

The MM operates in three stages, as described below. In the illustrative embodiment of FIGS. 7–10, "decisions" are analogous to the format descriptors, the "in-flow" is analogous to the input format descriptor series, and the "out-flow" is analogous to the output format descriptor series of FIGS. 1–6. Accordingly, one pass through steps 1, 2, and 3 is performed for a unicast situation. The steps are:

1. In flow traversal and action determination. Each decision on the in-flow is analyzed, and appropriate actions are recorded for use during out-flow traversal. Any information present in the in-flow decision, which is needed during execution of that action on an out-flow decision, is stored in the action.
2. Out-flow traversal and action execution. Each decision on the out-flow is analyzed, and the action recorded by the corresponding in-flow decision is executed. Execution of actions results in the incremental construction of both the microprogram and associated parameter data.
3. ME programming. The newly-constructed microprogram and parameter data are written into the ME's memory, and the ME is made aware of them.

The MM includes a set of action objects. Action objects are an implementation of the translator objects described in FIGS. 1–6. Action objects support the abstraction of operating in a specific and distinct way on a number of protocol stack layer-specific headers 106, 108, and 110 within the received frame 40. Through execution of assembly code microprograms 100, 102 and 104 associated with these action objects, the ME can modify frame headers for various combinations of forwarding functions and media encapsulation translations.

The MM programs the ME 38 to perform frame modifications for a specific information flow referred to as a "frame stream". The MM is built around three object types: action objects, visitor objects, and collector objects. Using these objects, the MM first examines a number of decisions corresponding to the frame stream, and creates and records the action objects necessary to process a received frame 40 of the frame stream. The MM will then apply these action objects to the out-flow decisions on each of the flow's output flows, resulting in a ME program which can transform frames from the input format to the desired output format, as in output frame 42, which includes frame headers 112, 114, and 116.

Visitors

Visitors are the mechanisms which perform in-flow and out-flow decision analysis. The visitor objects may for example be modeled after the template described for visitors in "Design Patterns—Elements of Reusable Object-Oriented Software" by Erich Gamma, Richard Helm, Ralph Johnson and John Vlissides, published by Addison-Wesley, copyright 1995, at pages 331–343, all disclosures of which are hereby included by reference herein. A visitor object runs type-dependent methods on each decision in a flow; this allows in-visitors to perform efficient action selection. In addition to performing decision analysis, visitors maintain state information between the analysis of different decisions on the same in-flow or out-flow. Separate visitors are used for in-flow and out-flow decision analysis, as they provide different functionality.

Collector

The mechanism which records actions during in-flow traversal, and records program instructions and parameters during out-flow traversal is the collector object. Once in-flow and out-flow traversal has been performed, the resultant information is extracted from the collector for use in ME programming. Whereas visitors maintain state information from decision analysis to decision analysis within a flow traversal, the collector maintains state information between in-flow traversal and out-flow traversal, and from flow traversal to ME programming.

Figure 8:
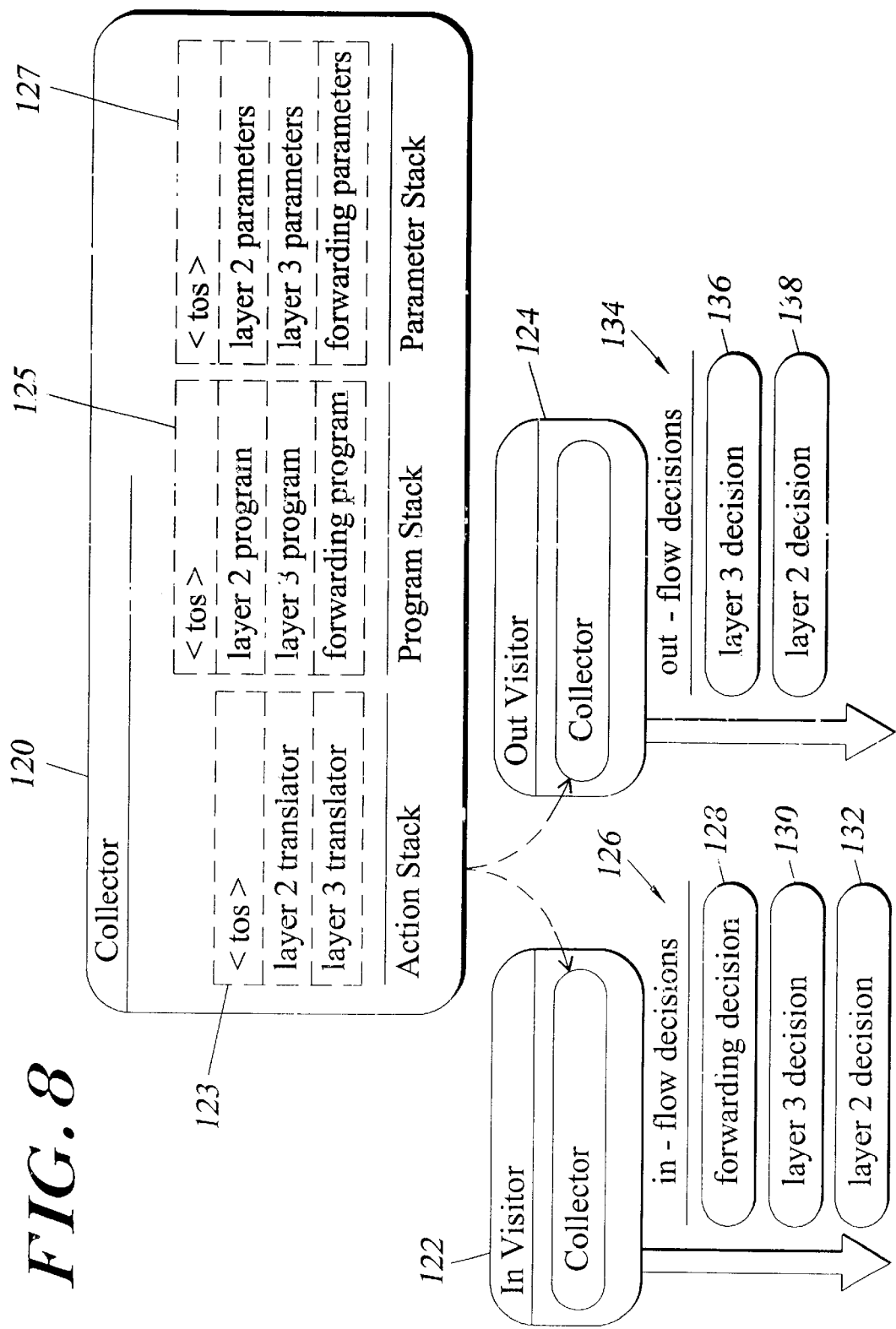
FIG. 8 depicts in-visitor, out-visitor and collector objects in an illustrative embodiment.

As shown in FIG. 8, the in-flow visitor 122 takes a collector object 120 with it during decision analysis. The information recorded during in-flow traversal is action objects 123; so the collector object 120 is the place where action objects 123 are recorded during in-flow decision traversal.

The out-flow visitor 124 takes the same collector object 120 with it during decision analysis. The out-flow visitor 124 gets its actions to execute from the collector object 120's recorded actions 123. The products of action execution are program fragments 125 and parameters 127. As shown in FIG. 8, the fragments 125 are recorded in the collector 120.

Actions

Actions 123 are the decision makers of the MM. The MM uses two types of actions; forwarding actions and translation actions. Actions are intended to operate on peer decisions in the in-flow and out-flow decision stacks 126 and 134 respectively. Thus, the action recorded for the layer 3 decision 130 on the in-flow decision stack 126 will be executed on the layer 3 decision 136 on the out-flow decision stack 134. Out-visitors are responsible for executing actions, but actions are responsible for synchronizing themselves with the out-flow decisions. Mechanisms for action execution are immediate execution and persistent execution.

Actions are created when in-visitor 122 analyses one of in-flow decisions 126 and determines that some action needs to be taken. The in-visitor 122 then creates an action appropriate to that decision. When the action is created, it records any information about the in-flow decision that will be needed later, during action execution.

Actions are executed during out-visitor decision analysis. The result of action execution may be to change some state in its host visitor (the out-visitor 124), record microprogram fragments 125 for later ME programming, or may be nothing at all, depending on the out-flow context in which it is executed.

In-Flow Traversal and Action Determination

In-flow traversal and action determination is the process of an in-visitor 122 interpreting each decision of the in-flow decisions 126, going from top to bottom. As each decision is visited, the visitor interpreter method for that decision type determines what is to be done. In most cases this is to record an action object for use by the out-visitor object 124.

In the situation where the in-visitor 122 cannot determine which action to take, the in-visitor 122 can defer recording an action to the next decision analysis, and maintain internal state to facilitate action determination at that time.

Figure 9:
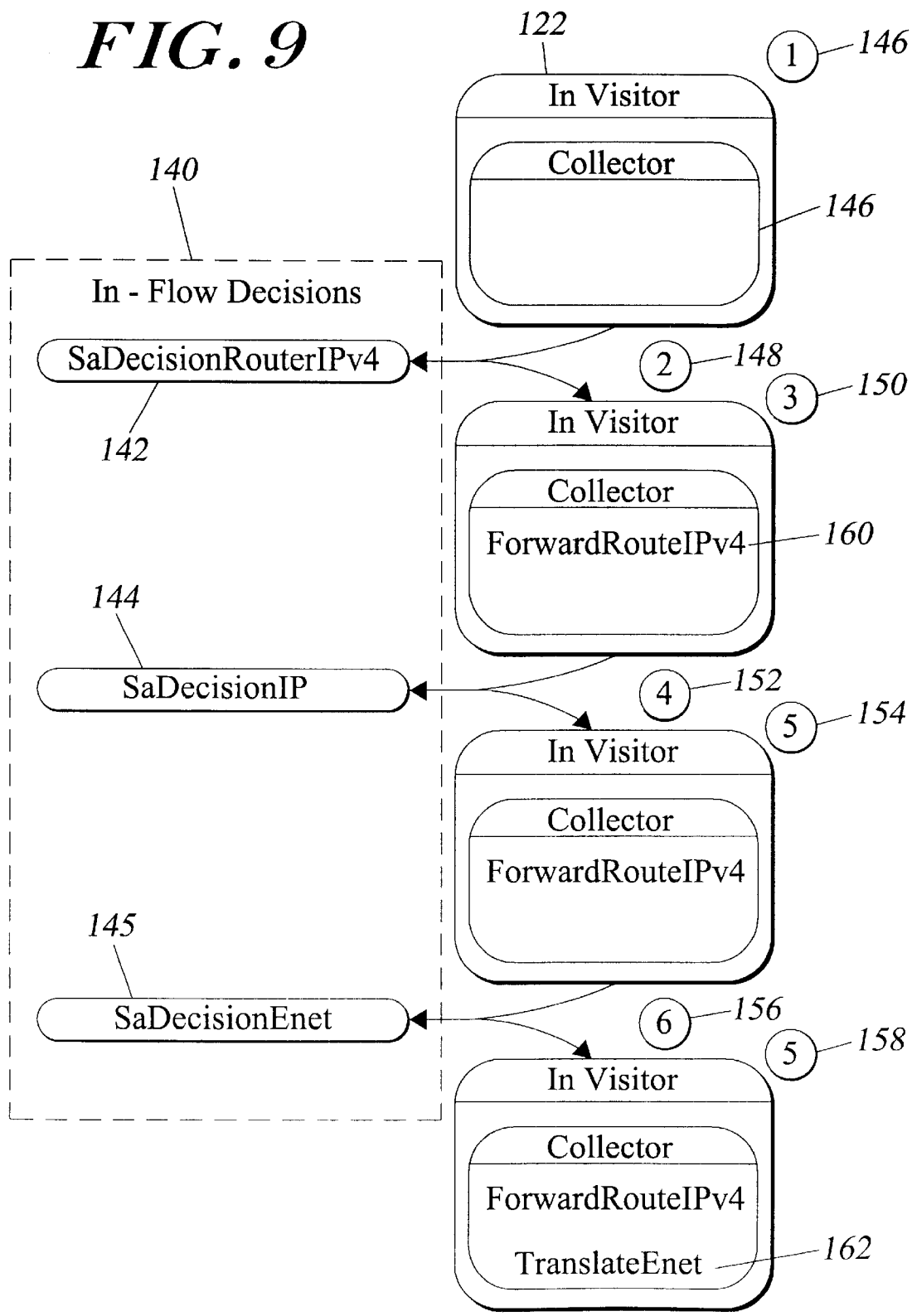
FIG. 9 depicts a series of steps performed during processing of input format descriptors.

For example, consider the case, illustrated by FIG. 9, of IPv4 Routing from Ethernet to LLC-Encapsulated Classic Internet Protocol (CLIP). At step 1 146 the invisitor 122 is sent to traverse the in-flow decision stack 140. At this point no actions have been recorded, so the collector 120 is empty. At step 2 148 the in-visitor 122 interprets the forwarding decision, in this case the IPv4 routing decision 142. A ForwardRouteIPv4 action object 160 is recorded into the collector object 120 at step 3 150. Next, the IPv4 decision 144 is visited and interpreted. At step 5 154, no program instructions or parameter data are recorded as a result of the IPv4 actions. At step 6 156 the Ethernet decision 145 is visited and interpreted. A TranslateEnet action object 162, in which the Ethernet decision's MAC address information is noted, is recorded at step 7 158 into the collector 120.

Out-Flow Traversal and Action Execution

Figure 10:
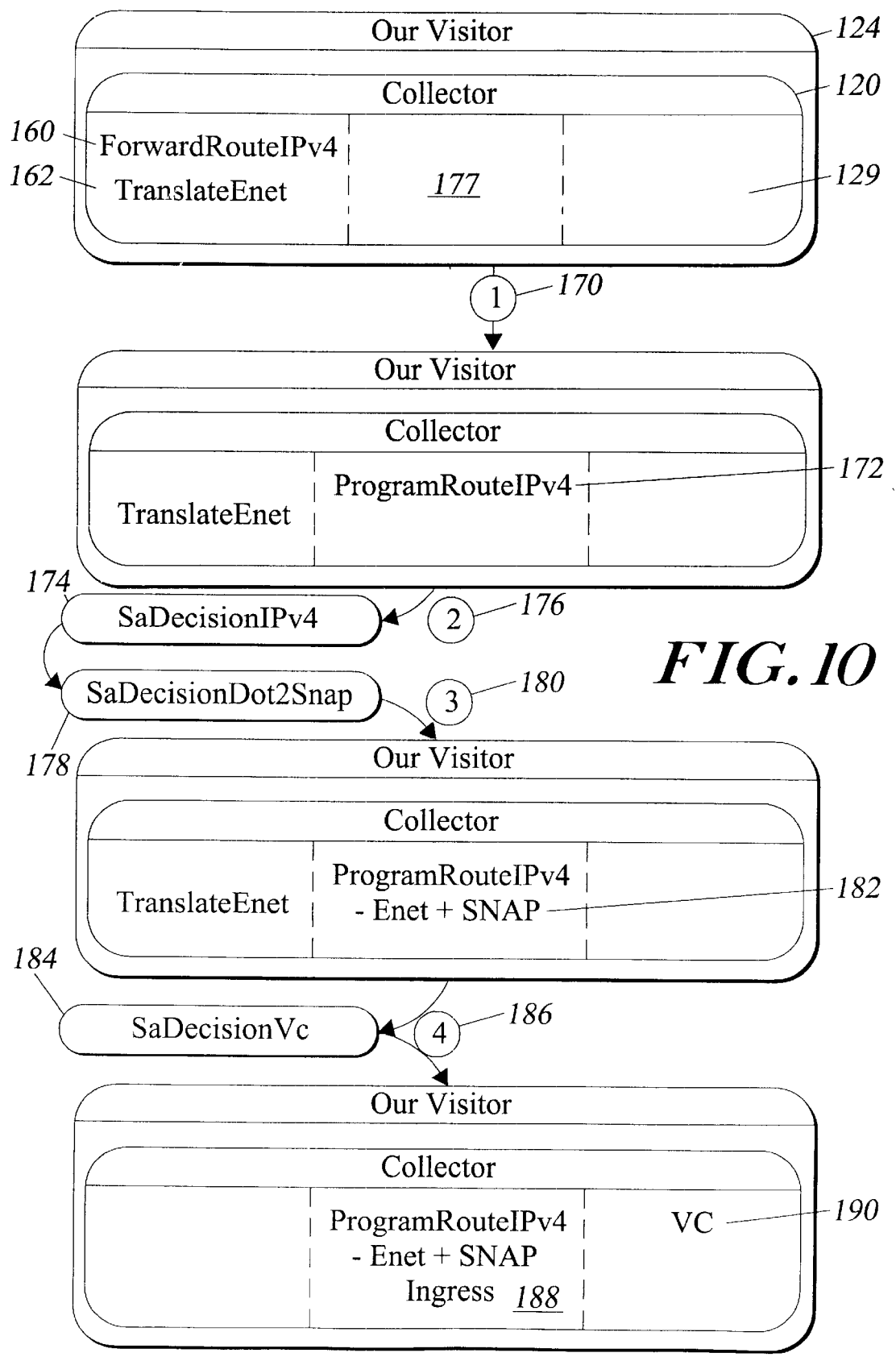
FIG. 10 depicts a series of steps performed during processing of output format descriptors.

As illustrated in FIG. 10, out-flow traversal is similar to in-flow traversal in that each decision on the out-flow is visited and interpreted, starting from the top. During out-flow traversal, however, actions which were recorded during in-flow traversal are now executed on the out-flow decisions.

Similar to the in-flow situation in which it may not be possible to determine which action to create by looking at just one in-flow decision, it may not be possible for an action to determine what should be done by analyzing only one out-flow decision. If an action is executed on an out-flow decision, and the proper result cannot be determined, the action may record state for use when the next decision is examined, and tell the host visitor object to let it persist. The visitor object will continue applying an action to each subsequent decision until that action indicates it is complete.

Actions are executed in the order they were recorded (FIFO). Once an action has executed, it is deleted, unless it has signaled that it should persist. Some actions do not need a decision to execute—they can be executed immediately, such as ForwardRouteIPv4 160. Others may need to examine more than one out-flow decision to finish execution, such as the case of a TranslateEnet being applied to a Dot2Snap decision; here the TranslateEnet decision must also see the following decision to determine whether to translate from Ethernet to VC-multiplexed or from Ethernet to LLC-encapsulated. And some actions have a one-to-one relationship between their in-flow and out-flow decisions, such as TranslateEnet operating on an Ethernet decision.

In FIG. 10, there is shown the same collector object 120 as before, but now also showing the collector's microprogram container 177 and parameter data container 179. At step 1 170 the ForwardRouteIPv4 action 160 is run; it is tagged for immediate execution and does not need to be run on an out-flow decision. This results in the recording of the IPv4 routing microprogram fragment 172, and no parameters. The ForwardRouteIPv4 action 160 indicates it has completed, and the collector 120 deletes it.

At step 2 176, the TranslateEnet action 162 is not tagged for immediate execution, so it is run on the next out-flow decision (which also happens to be the first decision), the IPv4 decision 174. No action is taken, but TranslateEnet 162 indicates that it should persist, and so is not deleted.

At step 3 180, the TranslateEnet action 162 is again run on the next out-flow decision, which this time is the SaDecisionDot2Snap decision 178. TranslateEnet 162 adds a microprogram fragment 182 that deletes the input frame's DLL (data link layer) header and adds an IEEE 802.2 SNAP LLC (note that the MAC sublayer of the DLL is still indeterminate at this point). Note also that no parameters are needed because all fields of an 802.2 SNAP LLC are known for IPv4 routing. Again, TranslateEnet 162 indicates that it should persist, and is not deleted.

At step 4 186, TranslateEnet 162 is again run on the next decision, this time SaDecisionVc 184. TranslateEnet 162 now knows that this is an IPoATM connection. A microprogram fragment 188 to handle ingress frames is recorded, and the VC number 190 is added to the parameter data for later use in constructing the ATM header. TranslateEnet relinquishes persistence, and is deleted.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media such as computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are disclosed with reference to a forwarding device based embodiment, the present invention is applicable to any application where a fast, real-time compiler is desirable. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for automatic program generation, comprising:

receiving at least one input format descriptor, wherein said input format descriptor describes a data unit format of a first communication protocol, wherein said input format descriptor corresponds to at least one layer in a predetermined communications protocol stack;

receiving at least one output format descriptor, wherein said output format descriptor describes a data unit format of a second communication protocol, wherein said output format descriptor also corresponds to said at least one layer in said predetermined communications protocol stack; and generating a program for converting an input data sequence corresponding to said at least one input format descriptor to an output data sequence corresponding to said at least one output format descriptor, and executing said program responsive to an input data stream conforming to said first communication protocol, and wherein at least a portion of said input data stream corresponds to said input data sequence.

2. The method of claim 1, wherein said input data sequence comprises at least one data type indicator.

3. The method of claim 2, wherein said at least one data type indicator corresponds to at least one field of a data unit input format.

4. The method of claim 3, wherein said data unit input format is Ethernet.

5. The method of claim 3, wherein said data unit input format is Internet Protocol (IP) over Asynchronous Transfer Mode (ATM).

6. The method of claim 1, wherein said output data sequence comprises at least one data type indicator.

7. The method of claim 6, wherein said at least one data type indicator corresponds to at least one field of a data unit output format.

8. The method of claim 7, wherein said data unit output format is Ethernet.

9. The method of claim 1, wherein said input data sequence comprises at least one data type indicator corresponding to at least one field of a data unit input format and wherein said output data sequence comprises at least one data type indicator corresponding to at least one field of a data unit output format, wherein said program is operable, in conjunction with a hardware processor, to convert an input data unit of said data unit input format to an output data unit of said data unit output format.

10. The method of claim 1, further comprising generating said at least one input format descriptor and said at least one output format descriptor, in response to receipt of an initial data unit of an information flow.

11. The method of claim 10, wherein said information flow is a mapping of an input port to an output port in a forwarding device associated with data unit header information in said initial data unit of said information flow.

12. The method of claim 1, wherein said forwarding device supports routing.

13. The method of claim 1, wherein said input data sequence corresponds to at least one data value.

14. The method of claim 13 wherein said at least one data value is an address.

15. The method of claim 1 wherein said output data sequence corresponds to at least one data value.

16. The method of claim 15 wherein said at least one data value is an address.

17. The method of claim 1, further comprising generating a program for converting said input data sequence corresponding to said at least one input format descriptor to a plurality of output data sequences corresponding to said at least one output format descriptor.

18. The method of claim 17 wherein said generating a program for converting said input data sequence corresponding to said at least one input format descriptor to a plurality of output data sequences corresponding to said at least one output format descriptor is responsive to receipt of an initial data unit associated with a point to multipoint information flow.

* * * * *